United States Patent [19]

Cislak

[11] 4,420,023

[45] Dec. 13, 1983

[54] DEVICE FOR COLLECTING HEAVY OIL AND TRANSFERRING IT TO SUITABLE CONTAINER

[76] Inventor: Raymond S. Cislak, 95 E. Craig Dr., Chicago Heights, Ill. 60411

[21] Appl. No.: 130,437

[22] Filed: Mar. 14, 1980

[51] Int. Cl.³ .............................................. B65B 3/26
[52] U.S. Cl. ................................. 141/198; 141/231; 184/1.5
[58] Field of Search .......................... 200/148 B, 148 D; 184/1.5; 141/198, 231, 232, 233, 311 R

[56] References Cited

U.S. PATENT DOCUMENTS

| | | | |
|---|---|---|---|
| 1,337,408 | 4/1920 | Morris | 184/1.5 |
| 2,603,312 | 7/1952 | Tabet | 184/1.5 |
| 3,489,245 | 1/1970 | Broadwell | 184/1.5 |
| 3,867,999 | 2/1975 | Cox | 184/1.5 |

*Primary Examiner*—Frederick R. Schmidt

*Attorney, Agent, or Firm*—Fitch, Even, Tabin, Flannery & Welsh

[57] ABSTRACT

An apparatus collects a leaking viscous liquid, such as grease from a bearing, and then transfers it under pressure for reuse or for reclaiming. The apparatus has an open top collector or head tank which may be positioned under the source of the leak. After a sufficient liquid head is present in the head tank the collected liquid flows through a check valve into a pressure vessel. A liquid level sensing means in the tank responds to a predetermined level of liquid in the pressure vessel to shift a valve to connect a source of high pressure air to the pressure vessel. Outlet conduit means from the pressure vessel allows the pressurized liquid to flow from the vessel. One way check valves are preferably used in the conduit means to restrict the liquid flow to that mentioned. Preferably the entire assembly is mounted on a lightweight skid to be easily moved.

9 Claims, 3 Drawing Figures

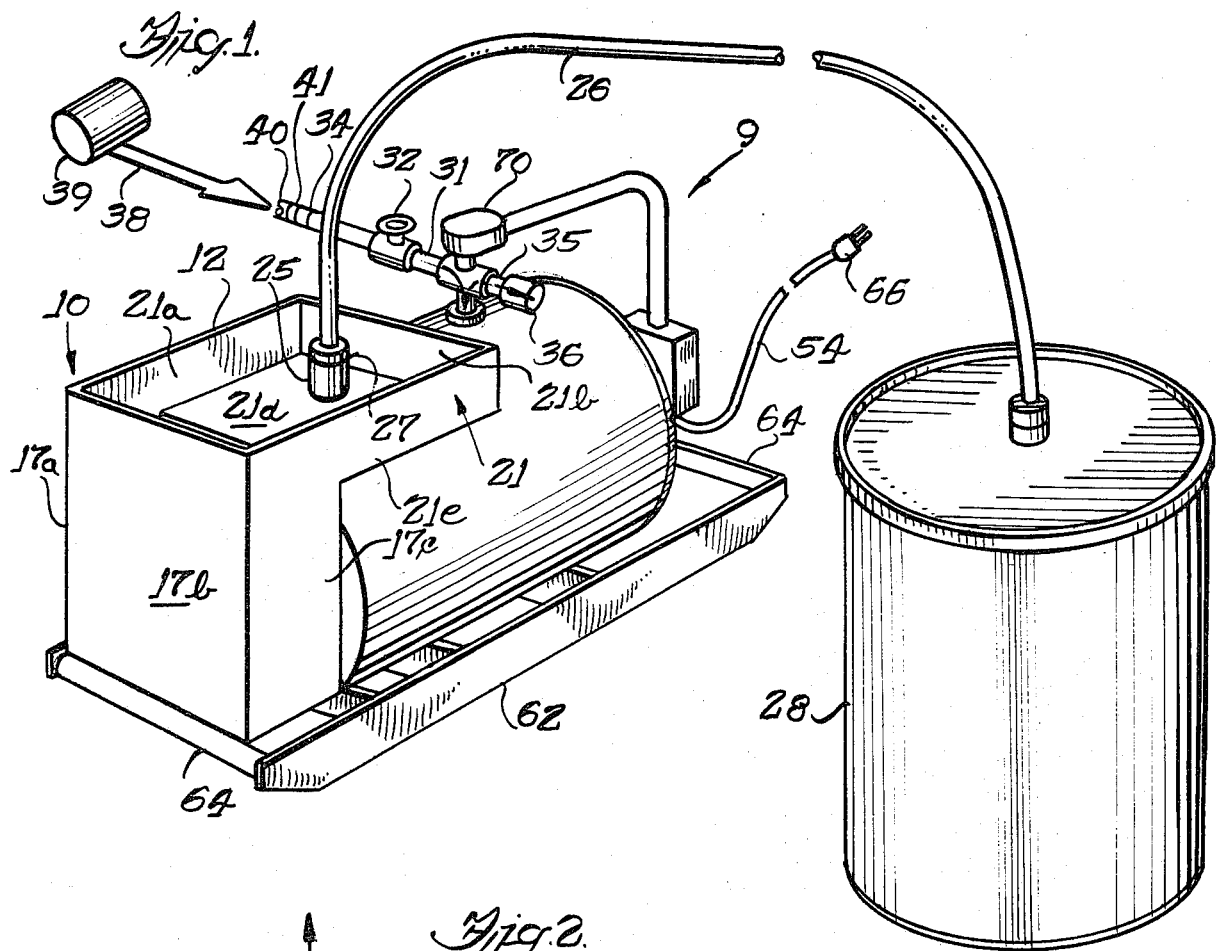
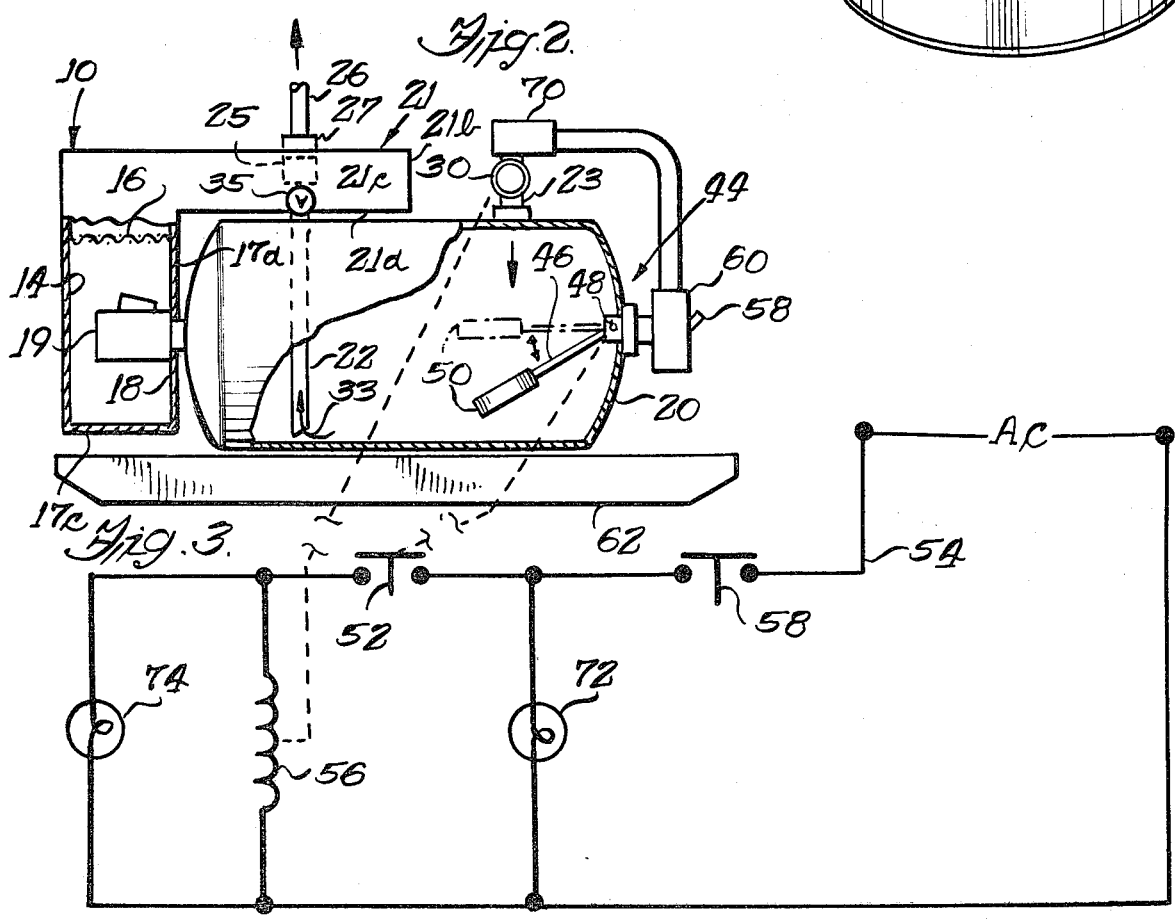

DEVICE FOR COLLECTING HEAVY OIL AND TRANSFERRING IT TO SUITABLE CONTAINER

BACKGROUND OF THE INVENTION

This invention relates to a method of and an apparatus collecting and transferring viscous liquids.

In many industrial installations, there are leaking bearings or machines which discharge relatively large quantities of grease or heavy viscous oil which has heretofore been discharged on land or water and this practice can no longer be employed. In other instances, the grease or oil is allowed to fall into a reclaimation system which uses various methods to separate the oil or grease from water and other foreign matter at a considerable expense. The present invention recognizes that there are instances when the oil or grease leaking from the machine may be captured before it excessively is contaminated and it may be either reused or transferred to containers e.g., barrels for further purification before reuse. Such equipment should be small, portable, relatively inexpensive, and capable of handling heavy viscous liquids which do not flow like water and hence will cavitate if tried to be pumped by the usual liquid impellor pumps.

More specifically, the present invention will be described, although it is not limited to, a steel company operation, in which heavy steel rolling presses are operated continuously and avoid at almost any cost the necessity of shutdown of the entire line. Under such circumstances, it frequently becomes necessary to run bearings even when they are leaking considerably. This is accomplished in many cases merely by accepting the resulting excess lubricant leakage from the bearing and by feeding more lubricant back into the bearing to compensate for the loss. Of great concern, however, is the fact that the leaked lubricant is generally wasted, or the cost of reclamation thereof from water and foreign matter is very high. Such areas become greasy and dangerous for continual access and manipulation of collecting barrels or the like if such are to be used to collect the leaking grease. The access to and areas about such rolls is limited for handling heavy barrels of grease, even if collected manually.

Another problem associated with the use of certain lubricants in the form of greases having high viscosities is that an ordinary pump will not effectively operate to move the grease, in that, cavitation occurs at the inlet passage to the pump. Consequently, efforts to utilize mechanical pumps in the collecting and reclaiming of a viscous liquid such as lubricating grease, generally have been proven unsuccessful.

SUMMARY OF THE INVENTION

In accordance with the present invention, leaking viscous liquid is collected in a head tank and a conduit means, including a one-way check valve, allows the liquid to flow from the head tank to a nearby pressure vessel. A liquid level sensing means is actuated at a given high level of liquid in the pressure vessel to shift the valve means to an operating condition allowing pressure air inflow to pressurize the pressure vessel and the liquid therein. An outlet conduit including a one-way check valve extends into the bottom of the pressure vessel to allow the collected pressurized liquid to flow from the pressure vessel to a line leading to the bearing for reuse or to containers located at a remote location. The system shuts down automatically when the liquid level falls below a predetermined level and recycles to again transfer liquid when a sufficiently high level of liquid again accumulates in the tank. Preferably, the entire assembly is small and lightweight, and is mounted on a skid of some sort to allow use at varying problem locations, for example, with the collector tank being located directly beneath a leaking greases bearing.

BRIEF DESCRIPTION OF THE DRAWING

FIG. 1 is a perspective view of a preferred embodiment of the subject apparatus illustrating the collector tank, the pressure vessel, and the air and liquid conduits;

FIG. 2 is a schematic flow diagram of the apparatus;

FIG. 3 is a schematic electrical circuit diagram for the preferred apparatus.

DETAILED DESCRIPTION OF THE INVENTION

As shown in the drawings for purpose of illustration, the invention is embodied in apparatus 9 which is preferably portable and capable of being moved to locations proximate the leaky source of grease or other viscous liquid. For instance, the apparatus may be on skids and pulled to location where a collecting means 10 in the form of a collecting tank or head tank may be disposed immediately under the leak with the heavy viscous liquid dropping directly into an open top 12 for the tank and then for accumulation in a lower head section 14. A screen 16 is interpositioned between the open tank top 12 and the storage section 14 in order to screen out large foreign objects from the viscous liquid in the head section. A conduit 18 is connected off the lower end of the head section 14 to a pressure vessel 20. A one-way check valve 19 associated with the conduit 18 allows flow of the collected liquid only from the tank 10 to the pressure vessel 20.

The preferred head tank is formed of sheet metal upstanding sidewalls 17a, 17b, 17c and 17d and a bottom wall 17e forming a box-like tank. Also, to aid in collecting the viscous liquid, an enlarged pan 21 is formed of sheet metal with sides 21a, 21b and 21c, and a bottom wall 21d leading to the head tank section 14.

When sufficiently viscous liquid, such as heavy grease, accumulates in the head tank, it will cover the one-way valve 19 and force it open to allow the grease to flow through inlet conduit 18 into the interior of the pressure vessel 20. Herein, the pressure vessel is generally cylindrical and supported on the skids with its axis extending longitudinally to reduce the height thereof. The grease will discharge from the inlet pipe and fall into the bottom of the pressure vessel. It will be appreciated that the flow of grease into the head tank section 14 may vary considerably, depending on the leak being caught. Likewise, the rate of accumulation of grease in the bottom of the pressure vessel 20 will also vary depending on the equipment leaks and the type of operation of the leaking equipment. Preferably, the pressure vessel will withstand relatively high compressed air pressures, e.g. about 100 psi.

In accordance with the present invention, heavy viscous liquids which would cavitate a pump, if they were tried to be pumped, may be accumulated within the pressure vessel 20 and then forced under air pressure from the vessel through an outlet means 22 which may be connected to a conduit or hose 26 which can extend back to the equipment with the grease being directly reused or to a collector reservoir such as a large storage drum 28 illustrated herein. This is achieved automatically and periodically under a control means in the form of a liquid level sensing means 44 which senses the liquid level within the pressure vessel 20 and operates an air valve mans 30 to allow compressed air to flow through the latter and into the tank to force the accumulated grease in the bottom of the pressure vessel upwardly through lower open end 33 of the outlet means 22. Preferably, a one-way valve 35 is provided in the outlet line to allow grease to flow out therethrough when pushed with sufficient force by the grease to automatically open. When the air pressure in the vessel falls, then the valve 35 will close automatically.

The preferred air valve means 30 is an electrically operated valve having one side connected to a pipe 31 having a manually operated on/off valve 32 connected across the pipe 31. The line 31 is provided with a quick connect disconnect coupling 41 which is connected to a mating coupling 40 connected to a line 38 extending to a source 39 of compressed air such as an air compressor. Usually, plants will have a source of compressed air nearby and it is an easy manner to connect the line 38 thereto. Surprisingly, the liquid flows very well under such air pressure with a lift or pressure drop of about 2.3 feet being achieved for each one psi of air pressure. Thus, 100 psi has been found to move grease or oil as much as 230 feet.

The illustrated liquid level sensing means 44 has an arm 46 pivoted about pin 48 and a float 50 at one end of the arm. As the level of the viscous grease rises, the arm 46 pivots upwardly about the pin 48 until it activates a switch mechanism 52. The switch mechanism 52 in turn is connected in a power circuit with a source of electrical power via line 54 and with the other components including solenoid 56 for operating the three-way valve 30 and an on/off switch 58. These switch components 52 and 58 are located in a junction box 60 serving also as the connection means to the power input line 54.

The liquid level control mechanism 44 might be in the form illustrated in U.S. Pat. No. 3,749,869 which has a magnetic switch surrounded by a permanent magnet that is shifted axially of the switch through the action of a rocker cam connected to the float arm 46. This arrangement thus isolates the entire electrical circuitry from the liquid contained in the pressure vessel so that no O-ring seals, diaphragms, bells or the like are required. Further, the float control can be accurately adjusted by suitably selecting the cam mechanism to allow for the switch to be shifted "off" at the proper low level of liquid in the pressure vessel as indicated in FIG. 2, or to be shifted "on" where the liquid level rises to the proper high level of liquid in the pressure vessel, where the same again is in phantom in FIG. 2.

Preferably, the apparatus is compact and reasonably lightweight to allow it to be brought into close proximity to the leaking bearing or other source of leaking viscous fluid. Along these lines and for this reason, the entire structure is preferably mounted on a flat skid 62 which has bars 64 at its opposite ends. Forked lift trucks may easily lift the apparatus. Again, because of the intended use as very portable piece of apparatus, the electrical power line 54 connected to the junction box 60 preferably has a conventional male connector 66 at its free end to allow ready connection to a wall outlet (now shown) so as to bring electrical power to the apparatus as needed. Further, the connection of the air pressure source is preferably made through the pair of quick disconnect couplings 34 and 41, previously indicated. Preferably, a similar quick connect and disconnect couplings 25 and 27 connect the liquid discharge hose 26 to the one-way check valve 35 and the liquid discharge line 22.

Concerning the operation of the unit, the apparatus would be located in a collecting position so that grease or other viscous liquid from the bearing or other source of such liquid will drip into the open top 12 of the collecting head tank 10. The pressure vessel 20 at this time is assumed to be vented through the three-way valve 30 and a muffler 36 leading to the atmosphere, so that the hollow interior of the vessel is at atmospheric pressure. After a collection of liquid in the storage section 14 of the collector tank 10, the check valve 19 will ultimately pass the grease through the check valve 19 and line 18 into the pressure vessel 20. The sensing means 44 is responsive to the liquid rising in the vessel, as symbolized by the float 50 riding near the top of the liquid, until at the given high level desired, the shifted flow triggers the switch 52. Upon the switch 52 closing, electrical power through the switch 52 and the on/off switch 58 operates solenoid coil 56 (FIG. 3) of the three-way valve 30 to shift the valve means 30 to open the valve and allow the high pressure source of air to flow through line 31 and through the valve 30 and then into the pressure vessel 20. This pressurizes the vessel 20 and the air pressure on top of the grease provides a large head or force to cause grease to flow thru the outlet pipe 22. This discharge of liquid continues until the float 50 has been lowered to the lower given level whereat the switch 52 opens to de-energize the solenoid 56 and cause the three-way valve 30 to shift to the alternate position where the pressure vessel 20 is vented through the muffler 36 to atmosphere. The check valve 24 maintains the fluid already discharged from the vessel downstream of the check valve; and the check valve 19 prevents reverse flow of grease into the head section 14, after the air pressure in the vessel 20 has been bled to atmosphere and sufficient accumulation of liquid is present in the head tank 14, the check valve 19 opens to allow the cycle to start over again for collecting and dispensing the reclaimed liquid.

While the apparatus only uses a single level control 44 which is preferred for the sake of economy of such, it is readily apparent that more than one such level control can be located in the tank, the lower control solely to detect the low level of liquid in the vessel and the upper level control solely to detect the high level of liquid in the vessel. Similarly while the solenoid illustrated is normally closed and is electronically opened, variations in this type of structure can likewise be provided; where the valve may be electrically held in the vented position and mechanically shifted then to the actuated positioned; or alternatively yet, where the valve is mechanically held by a detent or the like in both operating positions and is electrically shifted again from one position to the other position.

Again, an important aspect of this invention is the ease by which the pneumatic pressure forces the viscous fluid from the pressure vessel 20 up through the lines to the reclaimer 28. This is true for highly viscous liquids in the range of 2200 SSU and where such would merely cavitate at the inlet of a normal mechanical pump. It is possible further to transport the collected liquid considerable distance with this pneumatic means, where the liquid may be collected and reprocessed before reuse. Further, it is possible with this apparatus to provide for a ready readmission back into the leaky bearing, for example, by means of a throttling device (not shown) to reduce the pressure in the bearing. Thus, an air pressure of 100 psi would be most effective for reclaiming the lubricant.

For safety, a safety pressure valve 70 may be positioned over the three-way valve and may open to relieve pressure in the vessel if the pressure should ever exceed a predetermined limit, e.g. 200 psi.

As illustrated in FIG. 3 the electrical circuit may include the on/off switch 58 connected between the power source and an indicator light 72 connected across the line. Likewise the normally open switch 52 corresponding to the float control mechanism 44 is illustrated in the circuit with the solenoid 56 and an indicator light 74 which when illuminated would indicate that electrical power is at the float switch part of level controller 44. The normally open switch 52 also allows for biasing the level control switch and provides for employing the pressure vessel when it is only partially full. The enclosures for the electrical switches are preferably explosion proof so that the switches will not cause any explosions or fires.

What is claimed is:

1. A transportable apparatus apparatus for collecting and for transferring heavy viscous liquids, said apparatus comprising:
   collecting means to collect the viscous liquid;
   a pressure vessel for accumulating and for holding the viscous liquid until air pressure is applied thereto to force the liquid from said vessel; means for venting the pressure vessel to allow viscous liquids to flow therein,
   a movable carrier for movement from one location to another having said collecting means and said pressure vessel mounted thereon;
   one-way valve means allowing viscous liquids to flow from said collecting means into said pressurized vessel;
   level sensing means for sensing the level of liquid in said pressure vessel;
   air inlet valve means for connection to a supply of pressurized air and for admitting pressurized air into said pressure vessel;
   liquid outlet means for delivering from said vessel a flow of viscous liquid being moved by air pressure; said one-way valve preventing flow of the viscous liquid from said pressure vessel to said collecting means, and
   valve means controlled by the level sensing means to close said venting means and to admit pressurized air to flow into said pressure vessel to force viscous liquid in the pressure vessel outwardly through said liquid outlet means, said level sensing means closing said air inlet valve means when said liquid level in said pressure vessel falls below a predetermined level.

2. An apparatus in accordance with claim 1 in which said liquid outlet means comprises an outlet pipe and a one-way valve allowing liquid flow only in the direction from the pressure vessel.

3. An apparatus in accordance with claim 1 in which said air inlet valve means includes a connection leading to the ambient atmosphere to bleed off the high air pressure from the inside of the pressure vessel.

4. Apparatus for collecting viscous liquids and for conveying same, the combination comprising a collector tank for accumulating the liquid; a closed pressure vessel; conduit means connecting the collector tank and the pressure vessel together and one-way check means associated therewith allowing liquid flow from the collector tank only to the pressure vessel; air passage means to the pressure vessel including valve means operable in a first condition for venting said vessel to the atmosphere, and operable in a second condition for connecting a source of air under pressure to said vessel; liquid level control means responsive to liquid in the pressure vessel at a predetermined level to shift the valve means to the second operable condition to allow high pressure into the vessel, and outlet conduit means from the pressure vessel and having one-way check means associated therewith allowing liquid flow under pressure only from said pressure vessel for transfer therefrom, and
   a skid means for holding said collector tank, said pressure vessel, said conduit means and associated check means, said valve means, and said level control means in working relationship.

5. Apparatus according to the combination of claim 4, further including separable mating couplings in the air passage means at a location between the source of air under pressure and said valve means, operable to allow the complete separation of said air source from the apparatus otherwise.

6. Apparatus according to the combination of claim 4, further including separable mating couplings in the outlet conduit means.

7. Apparatus according to the combination of claim 4, further including separable mating couplings in the air passage means at a location between the source of air under pressure and said valve means and further including separable mating couplings in the outlet conduit means at a location between the the one-way check means and said collection tank, operable thereby to allow the complete separation of said air source and said collection tank from the apparatus otherwise.

8. Apparatus according to the combination of claim 7, further providing that said valve means is in the form of a three-way valve.

9. Apparatus according to the combination of claim 7, further providing that said valve means is electrically actuated, further providing that said liquid level control means includes a switch that is opened and closed responsive to the liquid in the pressure vessel being at said given levels therein, and further including means to transmit electrical power to the apparatus for operation of said valve means.

* * * * *